United States Patent [19]

Yoshino et al.

[11] B 3,921,209

[45] Nov. 18, 1975

[54] DIGITAL RECORDING AND REPRODUCING SYSTEM EMPLOYING ΔPCM

[75] Inventors: Hirokazu Yoshino, Katano; Tetsuo Yamaguchi, Hirakata; Eiichi Tsuboka, Nara; Hiroshi Hatano, Katano, all of Japan

[73] Assignee: Matsushita Electric Industrial Co., Ltd., Osaka, Japan

[22] Filed: June 13, 1972

[21] Appl. No.: 262,287

[44] Published under the Trial Voluntary Protest Program on January 28, 1975 as document no. B 262,287.

[30] Foreign Application Priority Data

| | | |
|---|---|---|
| June 18, 1971 | Japan | 46-44297 |
| June 18, 1971 | Japan | 46-44318 |
| Dec. 8, 1971 | Japan | 46-99745 |

[52] U.S. Cl. .......... 360/32; 360/8; 360/23; 360/33

[51] Int. Cl.$^{2}$ .......... G11B 5/02

[58] Field of Search .......... 179/100.2 R, 100.2 K; 340/172.5, 174.1 C, 174.1 G, 174.1 H, 174.1 J; 346/74 M; 360/8, 23, 32, 33

[56] References Cited

UNITED STATES PATENTS

| | | | |
|---|---|---|---|
| 3,311,904 | 3/1967 | Talsoe | 340/174.1 G |
| 3,319,013 | 5/1967 | Hodder | 179/100.2 R |
| 3,388,375 | 6/1968 | Sloughter | 179/100.2 R X |
| 3,435,135 | 3/1969 | Yasuoka et al | 179/100.2 R X |
| 3,449,757 | 6/1969 | Law | 179/100.2 R X |
| 3,573,744 | 4/1971 | Rigazio | 340/172.5 |
| 3,588,836 | 6/1971 | Frazier, Jr. | 340/174.1 G |
| 3,596,253 | 7/1971 | Ruth et al. | 340/172.5 |
| 3,641,503 | 2/1972 | Cullen | 340/172.5 |
| 3,700,320 | 10/1972 | Brewer et al. | 340/172.5 X |

*Primary Examiner*—Gareth D. Shaw
*Assistant Examiner*—Michael Sachs
*Attorney, Agent, or Firm*—Stevens, Davis, Miller & Mosher

[57] ABSTRACT

A magnetic recording and reproducing system including apparatus for converting a signal to be recorded into a ΔPCM code, a sampled value being represented by *n* bits, and apparatus for applying a signal corresponding to each of the *n* bits in the form of a NRZ code to each of *n* magnetic heads arranged in parallel in the transverse direction of a magnetic tape, the *n* bits being recorded on at least n parallel tracks and being reproduced from the magnetic tape.

3 Claims, 29 Drawing Figures

DIGITAL RECORDING AND REPRODUCING SYSTEM EMPLOYING ΔPCM

BACKGROUND OF THE INVENTION

This invention relates to a method of magnetic recording in which an information signal to be recorded is converted into a parallel digital signal of a plurality of bits and recorded into a magnetic recording medium by means of a plurality of magnetic heads corresponding to respective bits, thereby lowering the frequency band of the recording signal for each head.

Description of the Prior Art

The conventional method of magnetic recording of video or audio signals which is of the analog type is accompanied by the disadvantages of distortion in their amplitude resulting from the lack of magnetic uniformity of the tape and lack of uniformity in contact between tape and head, variations in the time axis due to the expansion and contraction or vibration of the tape, or in the case of the rotary head type, due to the lack of uniformity in the rotation of the head-driving motor, variations in the output level of reproduced signals caused by the difference in sensitivity between the heads, and the resulting deterioration of the S/N ratio as well as jitter, wow, flutter and flicker. These disadvantages have so far been considered as intrinsic factors of a magnetic recording and reproducing system.

These noises are increased with each reprint of tape, and the transfer which occurs during tape storage is another major cause of increased noise. Another disadvantage of the prior art system of the analog type which functions to search for a recorded section is the complexity of an added searching circit in which a specific frequency or digital signal written in an audio or control channel is read out for detection.

Summary of the Invention;

This invention has as an object the elimination of, these disadvantages of the conventional analog recording method, by providing a new method of recording and reproduction by modulating a recorded signal into a digital one in order to lower the substantial recording frequency band for each magnetic head. The modulation system employed in the present invention is of the ΔPCM (differential pulse code modulation) type which performs the recording operation with a non return-to-zero (NRZ) code, and according to which the recording medium is magnetically saturated positively or negatively for recording purposes in accordance with the information to be recorded.

The ΔPCM system employed in the invention is a kind of predictive coding system in which there is transmitted a difference signal between an actual signal and a value which is predicted from a signal preceding the actual signal. The ΔPCM system is; effective in the modulation of signals such as video signals of high redundancy and is capable of operating on fewer bits than the ordinary PCM, while the NRZ code permits higher density of recording. A ΔPCM system is explained in detail in the publication by J. B. O'Neal. Jr., "Predictive Quantizing Systems (Differential Pulse Code Modulation) for the Transmission of Television Signals," Bell System Technical Journal Vol. 45, No. 5, May–June 1966, Pgs. 689 – 721.

Figure 8:
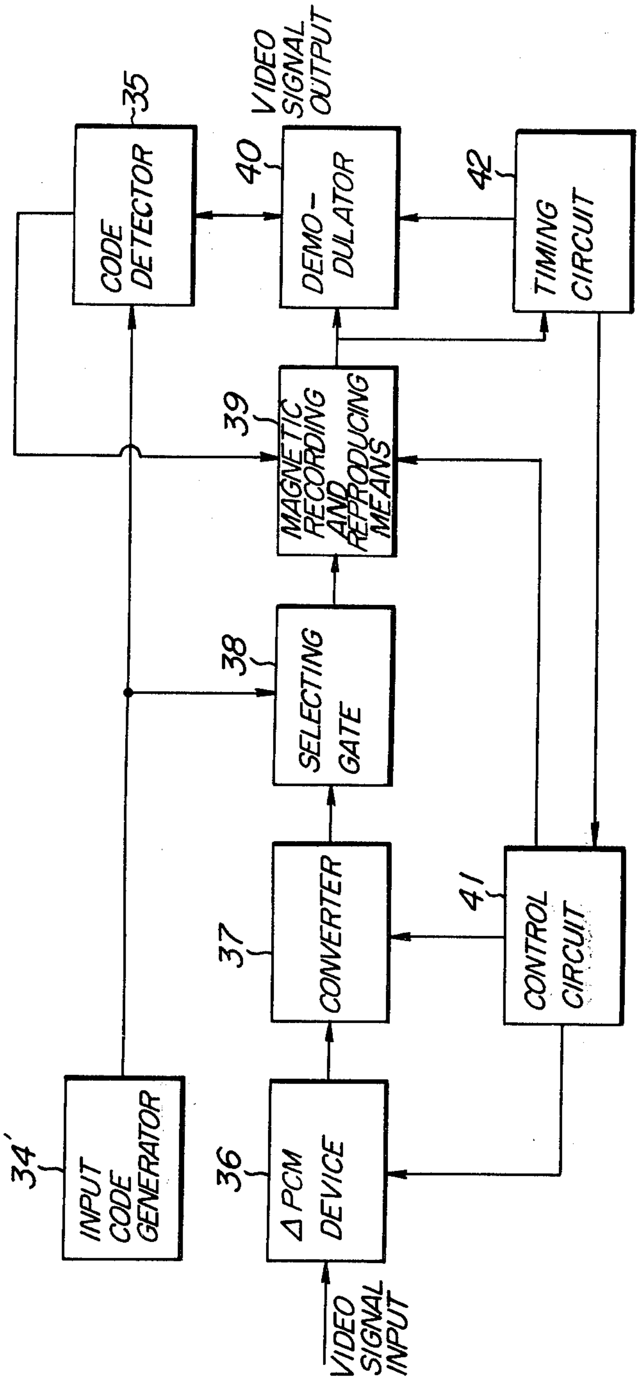
Figure 9:
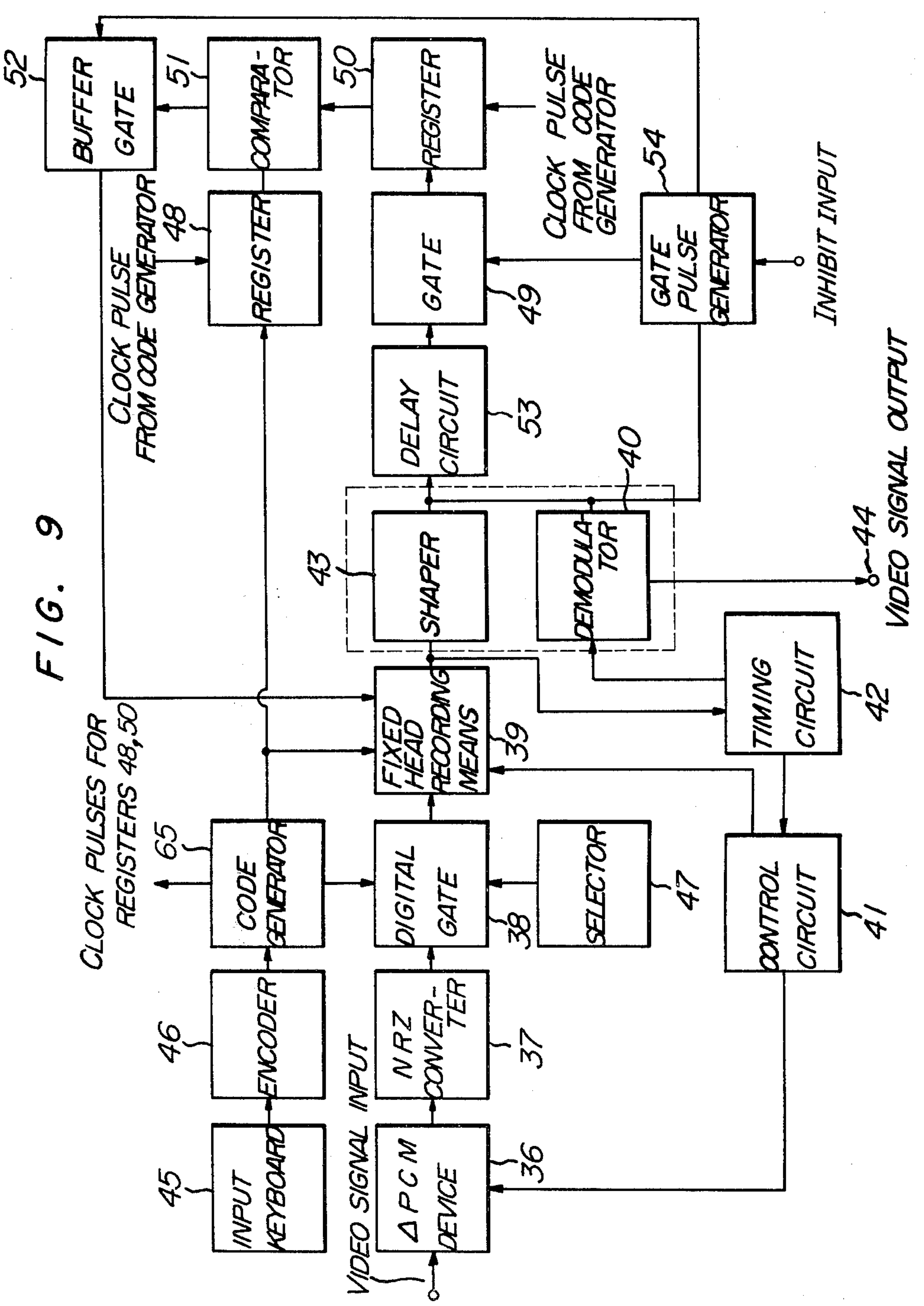
Figure 10:
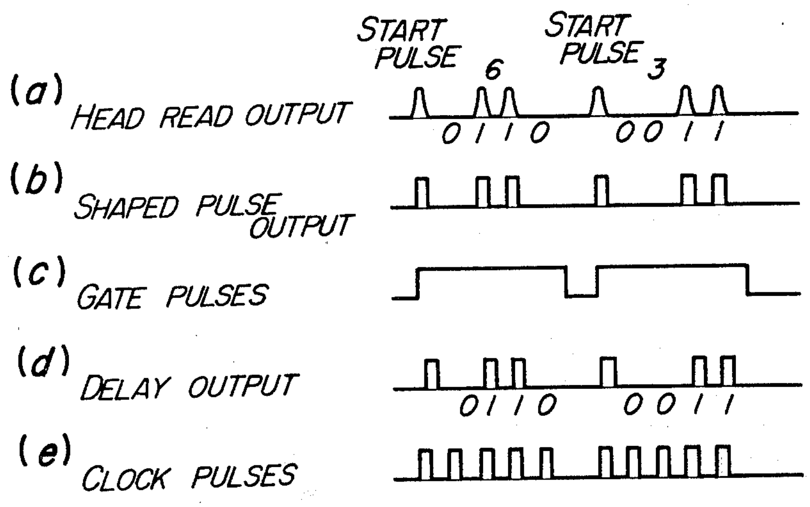
Figure 14:
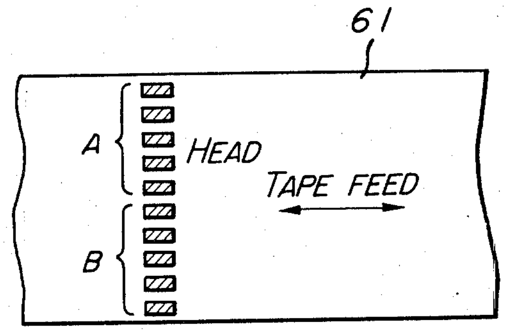
Figure 11:
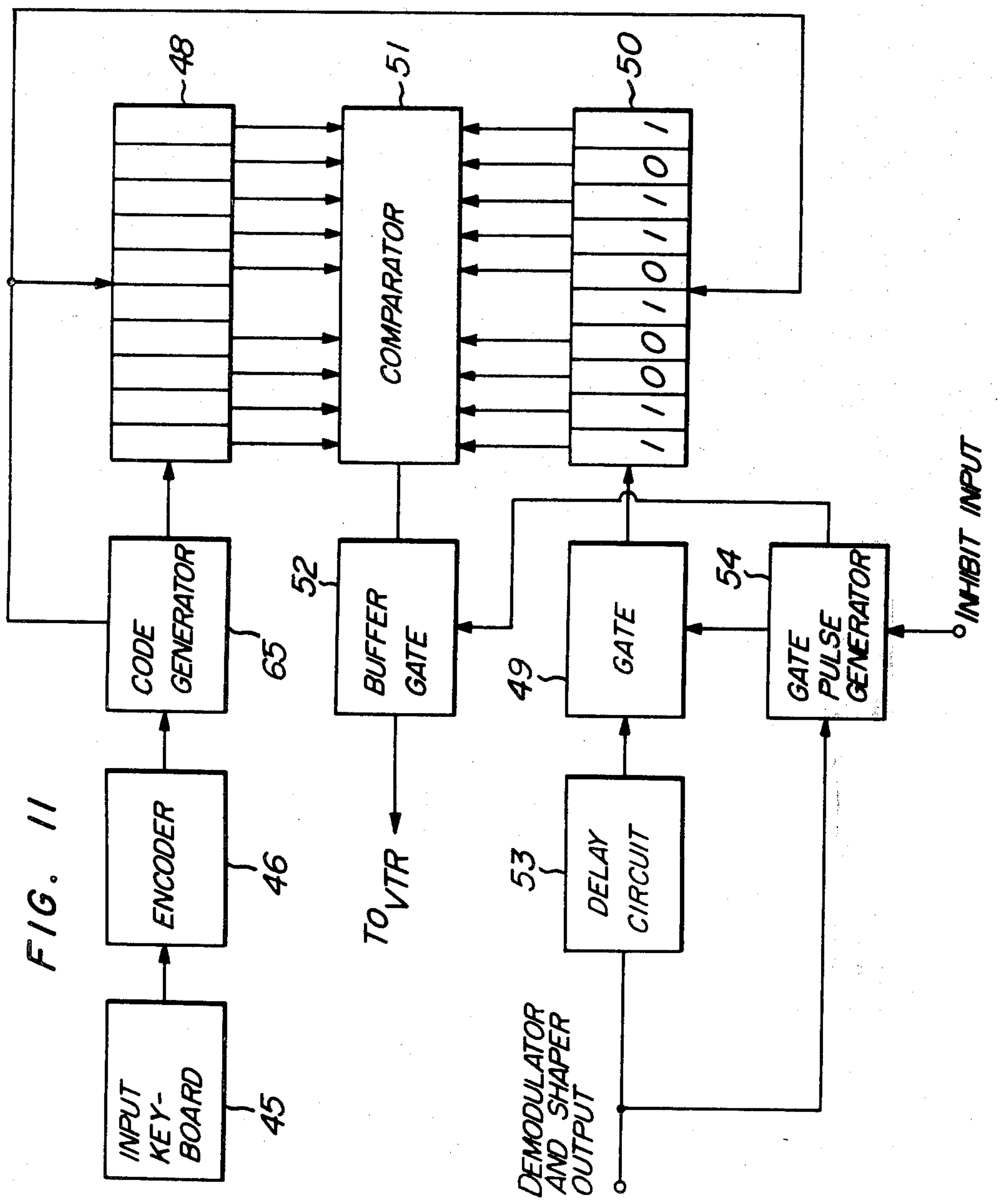
Figure 12:
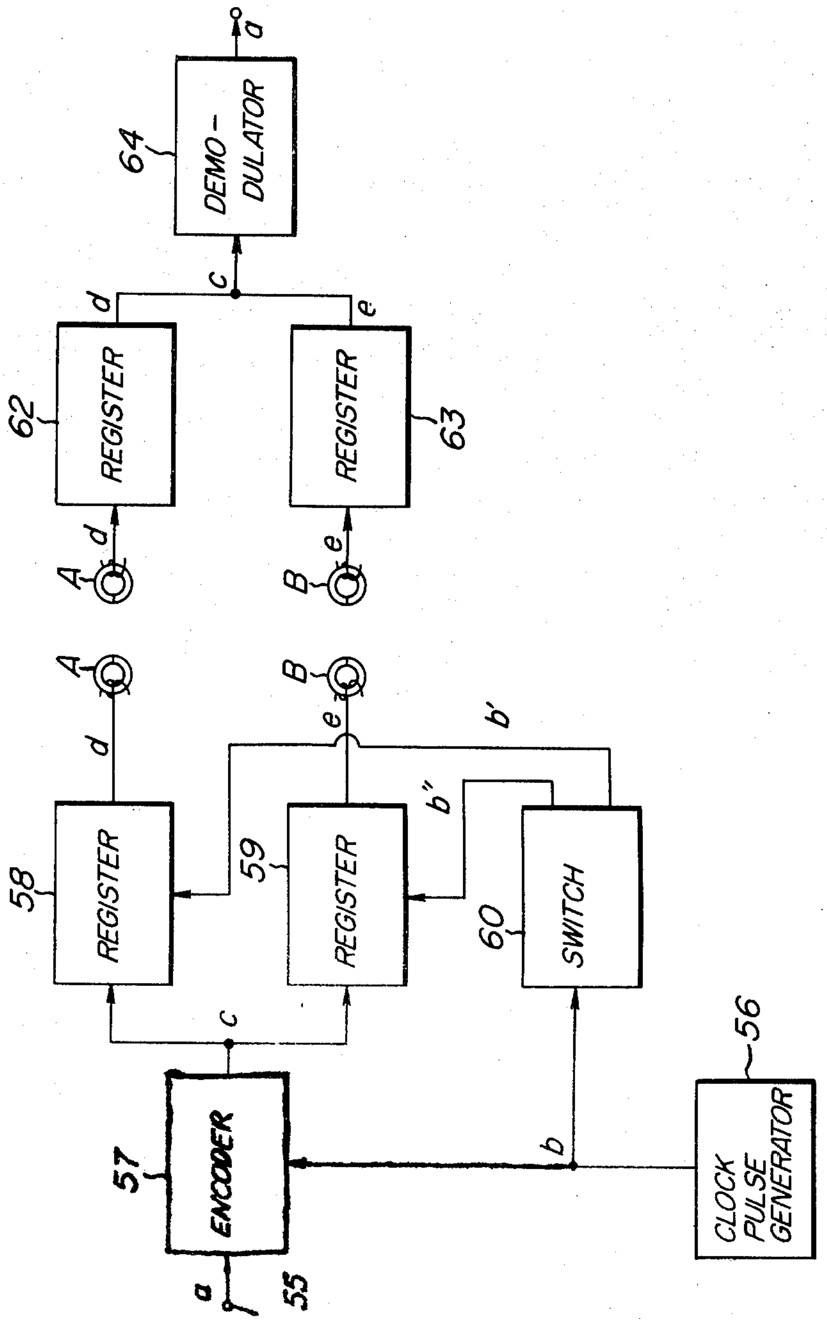
Figure 13:
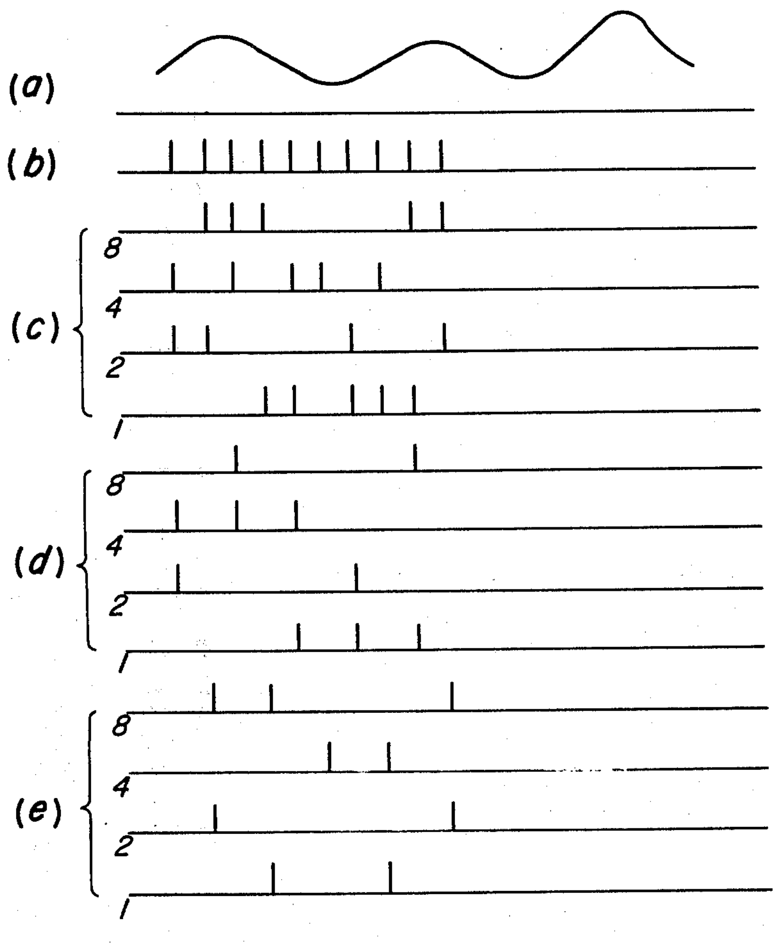

FIG. *7b* is a graph showing the amplitude spectrum of the NRZ code;

FIG. *7c* shows a reproduction characteristic of the magnetic recording and reproducing device;

FIG. 8 is a block diagram showing the fundamental arrangement of the digital control circuit of the magnetic recording and reproducing device according to the present invention;

FIG. 9 is a block diagram showing the circuit of FIG. 8 more in detail;

FIG. 10 is a time chart for detecting the searching address code according to the invention;

FIG. 11 is a diagram showing in detail the code detector circuit of FIG. 8;

FIG. 12 shows an embodiment of the invention for reducing the record signal band for each of the plurality of heads used in performing magnetic recording operations with the digital code according to the present invention;

FIG. 13 is a diagram showing the waveforms for explaining the operations of the embodiment of FIG. 12; and FIG. 14 is a diagram showing the relationship between the magnetic tape and the plurality of magnetic heads.

Description of the Preferred Embodiment

Figure 1:
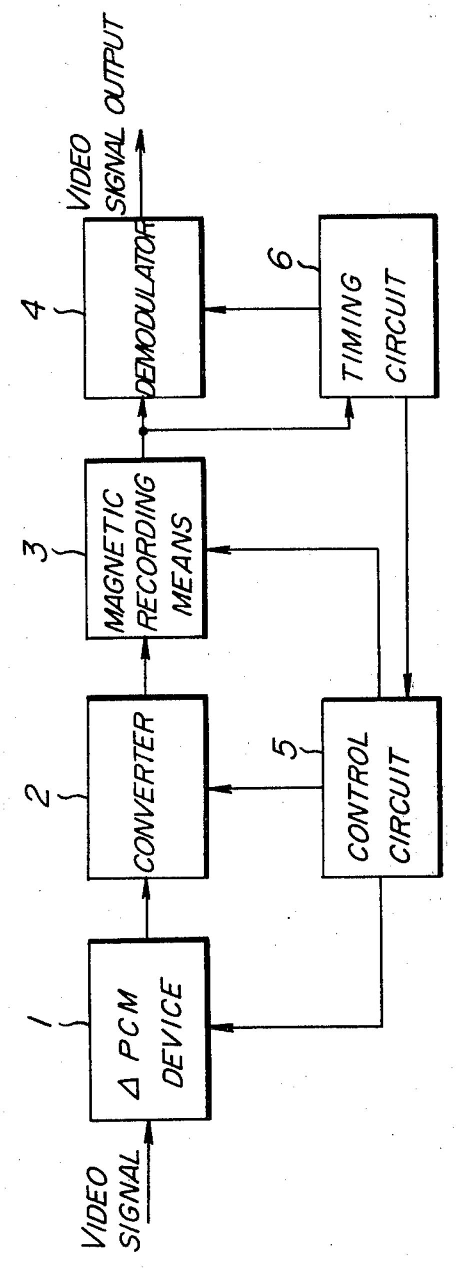
FIG. 1 is a block diagram schematically showing the recording and reproducing system of the magnetic recording and reproducing device according to the present invention.

Referring to FIG. 1 showing the general structure of the recording and reproducing system according to the present invention, the reference numeral 1 shows a ΔPCM system for converting a video signal to be recorded into a ΔPCM code, numeral 2 a converter circuit for converting the ΔPCM code which is an output of the ΔPCM system 1 into a code of the NRZ mode, numeral 3 a magnetic recording device which comprises five parallel fixed heads in the case of this embodiment as will be described more in detail later, and numeral 4 a demodulating circuit for demodulating the ΔPCM code from the magnetic recording and reproducing system 3 to obtain a video signal. The numeral 5 shows a control circuit incorporating a reference signal generator which produces a clock signal for the ΔPCM operation and also for controlling the tape feed of the magnetic recording device 3. The numeral 6 shows a timing circuit which receives a timing pulse from a pulse train produced by the magnetic recording device 3 and applies it to the demodulating circuit 4, while at the same time using the same signal to control the tape feed of magnetic recording device 3 through the control circuit and to dampen jitter.

Figures 7A, 7B, 7C:
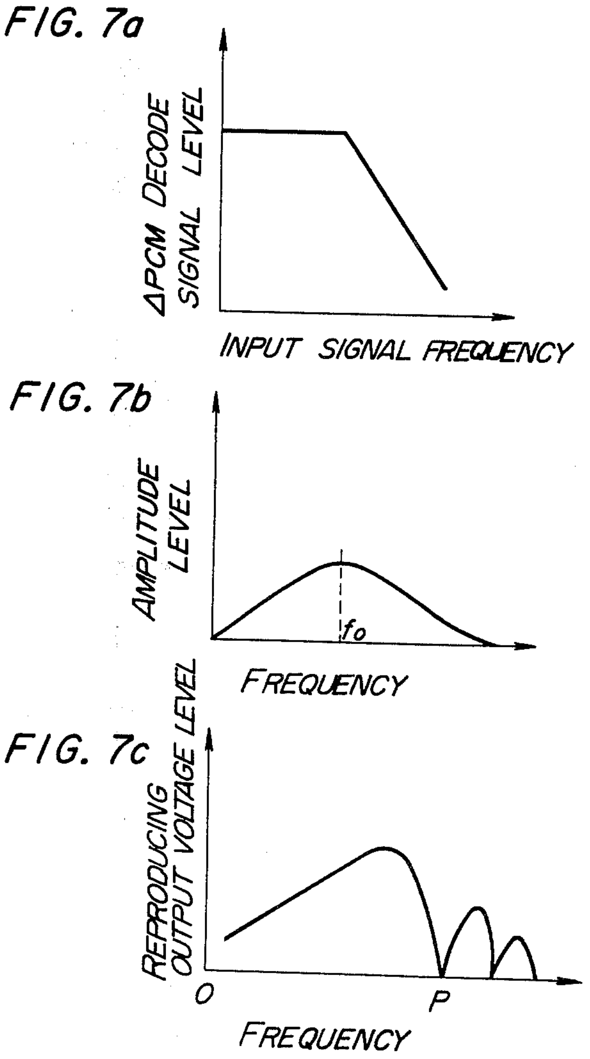
FIG. 7 is a diagram showing the relationship between input signal frequency and the ΔPCM composite signal.

The frequency characteristic of each part is shown in FIGS. *7a* to *7c* in which FIG. 7a shows a ΔPCM decoding signal level relative to the input signal frequency, FIG. *7b* an amplitude spectrum of the NRZ code of the average frequency *fo*, and FIG. 7*c* the relationship between the frequency and the reproduction output voltage of the magnetic recording and reproduction system.

Assuming that the band of a video signal to be recorded is 1 MHz, the sampling frequency must be higher than 2MHz. But if an NRZ code is used, the amplitude spectrum *fo* of the ΔPCM output code train is more than 1MHz in FIG. 7*b*. In FIG. 7*c*, if *fo* is successfully included in the frequency range from O to P which is the range actually used, it is possible to record and reproduce an NRZ wave. For this purpose, tape speed should be about 3 meters per second.

Figure 2:
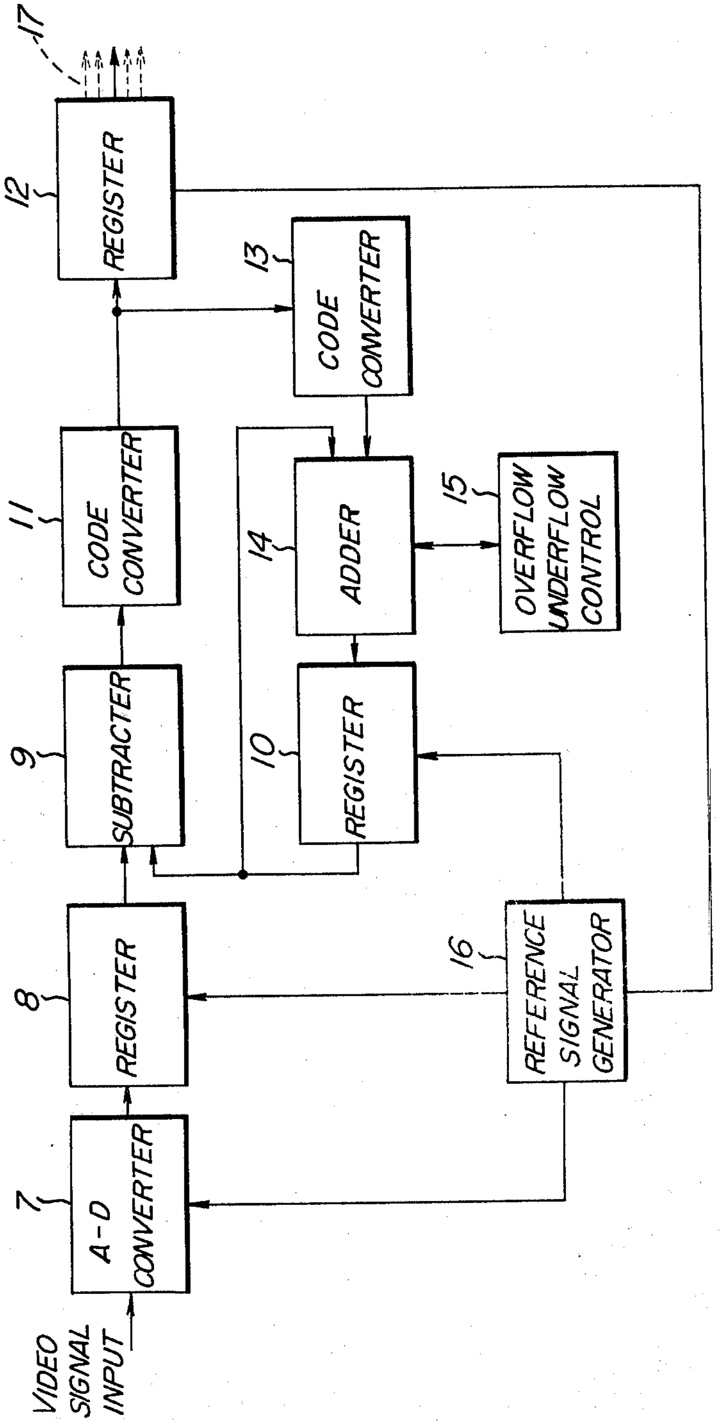
FIG. 2 is a block diagram showing an example of the ΔPCM system.

An actual example of the ΔPCM system 1 of FIG. 1 is shown in FIG. 2. In this figure, the reference numeral 7 shows an A–D converter for converting a sampled value into, say, a series digital code of "sign + 8 bits." The numeral 8 shows a register for temporarily storing the output of the A–D converter 7 and converting a series signal into a parallel signal. This ΔPCM system is arranged for high speed parallel operation. The numeral 9 shows a subtracter which detects the difference between the information stored in registers 8 and 10. In this embodiment, the code converter circuit 11 functions to convert the output of subtracter 9 of "sign + 8 bits" into "sign + 4 bits". The obtained code is applied to the register 12 to become an NRZ code. These "sign + 4 bits" is again converted into "sign + 8 bits" by the code converter circuit 13. The numeral 14 shows an adder for figuring out the algebraical sum of the output of the code converter circuit 13 and the output of the register 10. This register 10 is used for temporarily storing the obtained result. The register 10 and adder 14 make up an integrator. In other words, assuming that the outputs of the code converter circuit 13 and register 10 are $xn-1$ and $yn-1$, respectively, the output of adder 14 is $yn = yn-1 + xn-1$. The numeral 15 shows an overflow-underflow control circuit which meets the condition that if $yn-1 + xn-1 \geqq 2^8-1 = 255$, $yn = 255$, and if $yn-1 + xn-1 \leqq -2^8+1 = -255, yn = -255$. The reference signal generator 16 is provided for the purpose of generating a timing signal for writing the information into and reading it out from the registers 8, 10 and 12 and performing an A–D conversion. Each order of the ΔPCM parallel code thus obtained (FIG. 5(*a*)) is sent in the five heads 17 disposed parallel in the transverse direction of the tape for parallel recording operation.

Figure 3:
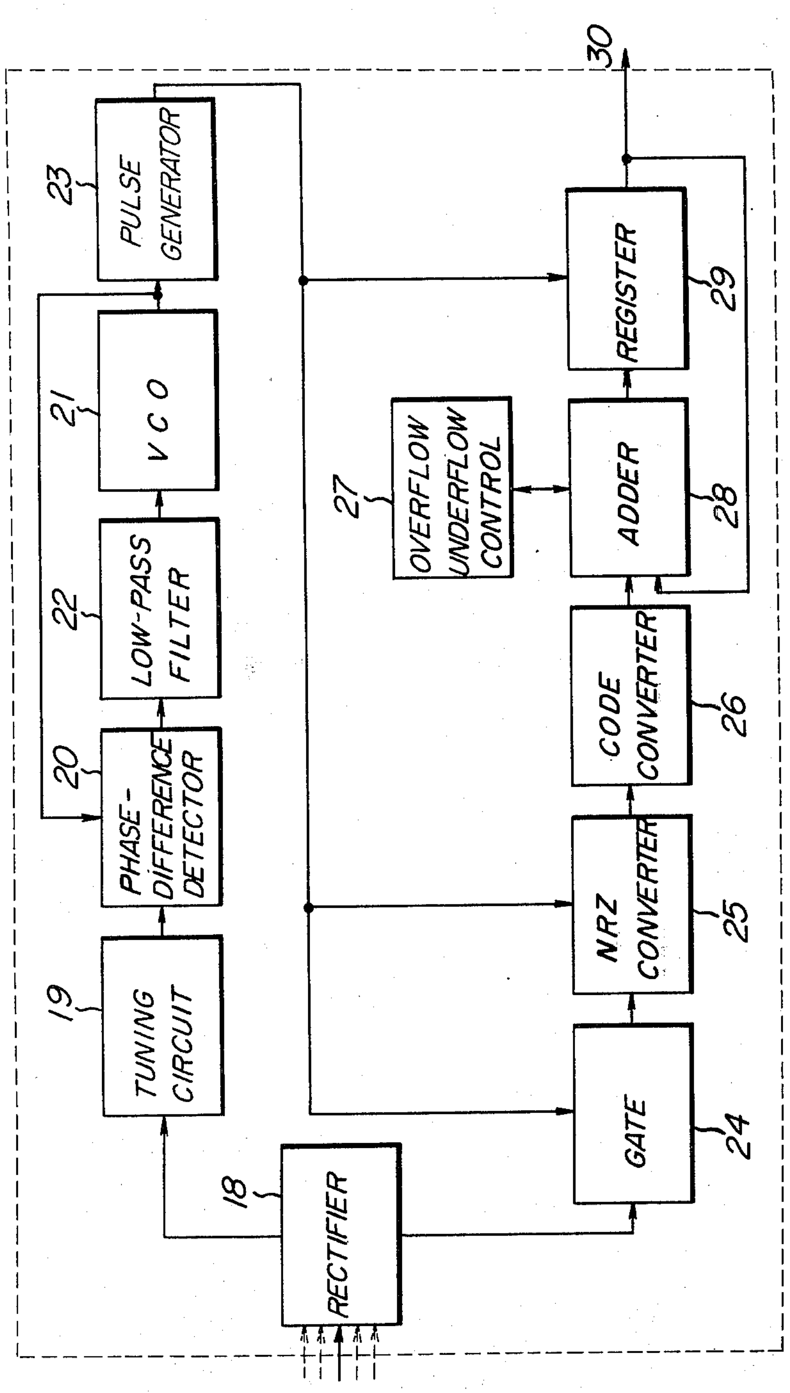
FIG. 3 is a diagram showing the reproducing means of a ΔPCM system.
Figure 5:
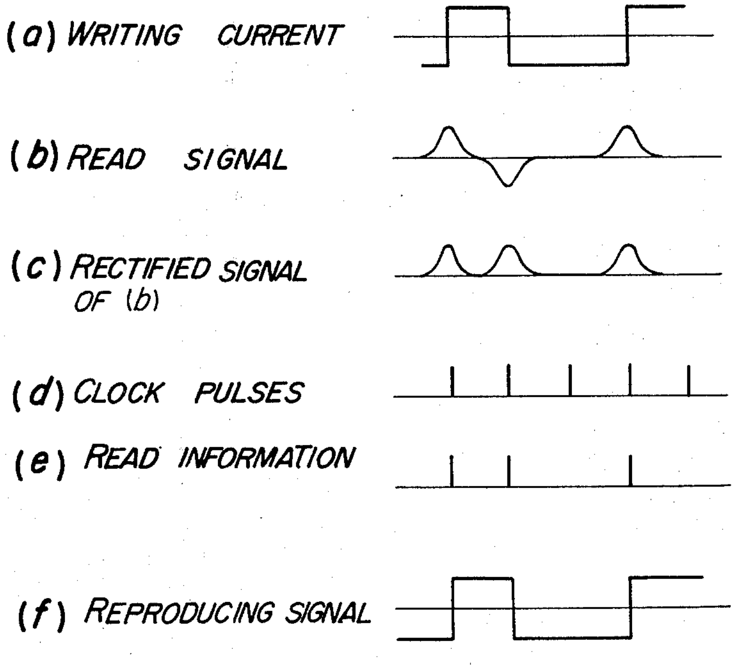
FIG. 5 shows waveforms for explaining the principle of reproduction.
Figure 6:
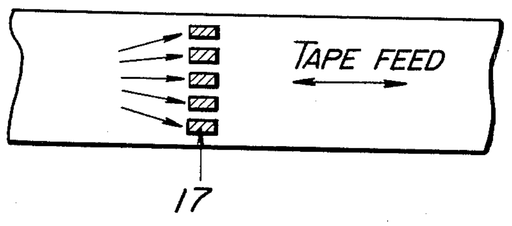
FIG. 6 is a diagram showing the relationship between head and tape.

FIG. 3 shows an embodiment of the circuit for obtaining a digital signal of "sign + 8 bits" used to read out the signal recorded on the tape and to reproduce a video signal. The numeral 18 shows a circuit for full-wave rectifying the signal of FIG. 5(*b*) which has been read out from each head 17 of FIG. 6. The tuning circuit 19 is used for picking out a sampled frequency component from the output signal of the rectifier circuit 18 shown in FIG. 5(*c*). The numeral 20 shows a phase difference detector for converting into a voltage the phase difference between the output of the voltage-control-type variable oscillator (VCO) 21 and that of the tuning circuit 19. This voltage based on the phase difference is smoothed by the low-pass filter 22 thereby to controlling the oscillation frequency and phase of VCO 21. The numeral 23 shows a pulse generator circuit for converting a sine wave signal generated by the VCO 21 into thin pulses shown in FIG. 5(*d*). These thin pulses which are synchronous with the sampled frequency are used as timing pulses for the reproducing system. In FIG. 3, the sections 18 and 24 to 29 make up a system for parallel processing operation, in which the gate 24 is used for sampling the parallel output C from the full-wave rectifier circuit 18 by use of the pulse d obtained from the pulse generator circuit 23, the gate 24 producing an output as shown in FIG. 5(*e*). The numeral 25 shows an NRZ converter circuit for converting the signal (*e*) into an NRZ code, producing an output as shown in FIG. 5(*f*). The numeral 26 shows a code converter circuit for converting the resulting signal of "sign + 4 bits" into the signal of "sign +8 bits" and has the same function as the circuit 13 shown in FIG. 2. The circuit 27, 28 and 29 of FIG. 3 are identical with the circuit 15, 14 and 10, respectively, shown in FIG. 2. As can be seen from above, there is produced at terminal 30 a parallel signal of "sign + 8 bits" from which a video signal is directly reproduced.

Figure 4:
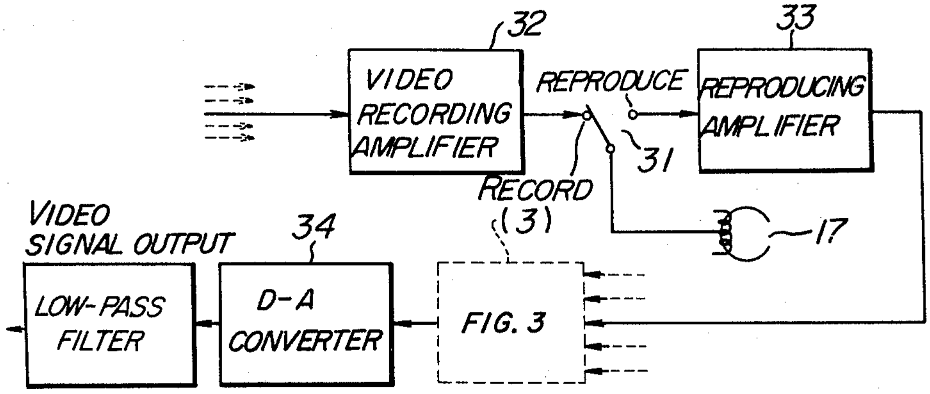
FIG. 4 is a block diagram showing the recording and reproducing heads and adjoining parts.

Referring to FIG. 4, closing the switch 31 to the recording side causes a signal appearing at the output terminal of the register 12 of FIG. 2 to be applied to the five video heads 17 for each order in parallel through the recording-amplifier circuit 32 thereby performing the recording operation on the tape. When the switch 31 is closed to the reproducing side, by contrast, the signal read out in parallel from the heads 17 is applied through the reproducing-amplifier 33 to the full-wave rectifier circuit 18 shown in FIG. 3, with the result that the output of register 29 of FIG. 3 is applied to the well-known D-A converter 34 in the form of the signal of "sign + 8 bits" and a video signal is obtained as an output of the D-A converter 34.

It will be understood from the above explanation that in the system of the present invention it is only the presence or absence of a pulse that counts and therefore the quality of the system is little affected by tape noise or printing. Nor is there any deterioration of the S/N ratio by printing. Further, the fact that the system according to the present invention is of the ΔPCM type results in fewer bits being required for one sampled value than the PCM type. Also, since bits are recorded in a plurality of channels by means of corresponding magnetic heads, the frequency band for each head is made smaller, thereby simplifying the system construction. In addition, the system according to the present invention performs all of its internal signal processing operations by the digital mode, so that the recorded section is searched very easily by writing in a key signal of a digital code in the same channel as a video signal.

Embodiments of the invention will be now explained with reference to the accompanying drawings.

The basic arrangement of a digital control circuit with searching means according to the invention used with a Video Tape Recorder(VTR) is shown in FIG. 8. In this figure, the reference numeral 34' shows a circuit for generating an input code for writing in a searching key code, which includes an input keyboard and a pulse generator circuit. The numeral 35 shows a code detector circuit for detecting the agreement between the pulse code written in the magnetic tape and the code code from the input pulse generator circuit 34, thereby to controlling the VTR, the numeral 36 a ΔPCM device for converting a video signal into a ΔPCM code, the numeral 37 circuit for converting the ΔPCM code into a code of the NRZ type, and the numeral 38 a digital gate which selects the writing of a search signal of the recording of a video signal and applies the result to the magnetic recording and reproducing means 39 of the fixed head type. The numeral 40 shows a demodulating circuit for producing a video signal by demodulating the ΔPCM code obtained from the magnetic recording and reproducing means 39. The numeral 41 shows a control circuit incorporating a reference signal generator which generates a clock pulse for ΔPCM thereby to controlling the tape feed of the magnetic recording and reproducing means 39. The numeral 42 shows a timing circuit which picks up a timing pulse for the demodulating circuit 40 out of a pulse train obtained from the output of the magnetic recording and reproducing means 39 at the time of reproduction, while at the same time controlling the tape feed of the magnetic recording and reproducing means 39 through the control circuit 41 thereby controlling jitter.

The digital control circuit of the magnetic recording and reproducing means embodying the present invention is shown in FIG. 9. In the recording mode, a video signal is modulated by the ΔPCM device 36 to be converted into "sign + 4 bits." This code is converted into an NRZ signal by the NRZ converter circuit 37 and applied through the digital gate 38 to the fixed-head recording means 39 thereby recording the parallel bits on the tape in parallel positions.

In the reproducing mode, on the other hand, a signal read out of each fixed head of the magnetic recording and reproducing means 39 is applied through the waveform shaping circuit 43 to the demodulating circuit 40 where it is processed to produce a signal of "sign + 8 bits," followed by the A-D conversion thereof. The resulting signal appears at terminal 44 in the form of a video signal.

In the search mode, the key signal applied from the input keyboard 45 is converted into a code by the encoder 46 and further into a corresponding pulse pattern by the code generator circuit 65, which pulse pattern is applied to the gate 38. At this time, the gate 38 shuts off the video signal with the aid of the selector circuit 47, while allowing the passage of only the key code as an address code into the magnetic recording means 39. This is followed by the selecting gate 38 being switched to the video recording side whereby the video signal is digitally processed for magnetic recording.

In the search and reading mode, the depressing of the input keyboard 45 causes an address signal to be applied through the encoder 46 and code generator circuit 65 to the register 48, while on the other hand the gate 49 is opened for a predetermined period of time by the output of the magnetic head to read the address signal, so that the digital signal written in the tape is read out and stored in the register 50. The outputs of register 48 and 50 are compared with each other by the comparator 51, and if they agree with each other, the video signal is read out for reproduction by means of the output pulse from the buffer gate 52.

In this case, the delay circuit 53, gate 49 and gate pulse generator circuit 54 function to store the address signal in the register 50. The output of the control circuit and a timing pulse from the timing circuit controls the tape speed and the demodulating circuit respectively in video recording and reproduction, thereby reducing time jitter.

A time chart of the key code and address signal is illustrated in FIG. 10, while the detector circuit for a searching address signal is shown in FIG. 11. The signal (a) read out of the heads is shaped by the waveform shaping circuit 43 of FIG. 9, and the gate pulse generator 54 of the monostable type shown in FIG. 9 is energized by the start pulse. The gate pulse (*c*) which is an output of the circuit 54 is used to open the gate 49 for a predetermined period of time, so that the delayed output (*d*) is stored in the shift register 50 by means of a clock pulse. Meanwhile, the search address signal is stored in the shift register 48, and the instant the writing operations of both the shift registers have been completed, their outputs are compared with each other by the comparator 51, with the result that an agreed output is any, is produced from the buffer gate 52 for the reproducing operation of VTR 39.

In FIG. 10, for example, the search address code indicates the address of "63." From this, it is apparent that the addresses ranging from 0 to 99 can be designated and searched for a two-digit decimal number. Further, it is needless to say that the system according to the invention permits not only the detection of an agreement as to the binary-coded decimal number of "63" but also the detection of an agreement as to the number of pulses at the time of the reproducing search in a system generating 63 pulses when "63" is designated.

Since the system according to the invention employs a digital recording means, it is possible to use the same head and channel for the reproducing search as for the recording and reproduction of a video signal. Also, a digital gate is used as a gate for writing, thus making possible a very simple VTR with the search function by digital control. Even though the preceding explanation of embodiments involves a recording and reproducing system based on ΔPCM, it is easily seen that it is applicable to all types of digital recording and reproducing means.

The embodiment of FIG. 12 shows a magnetic recording system for recording signals by encoding them, in which the rcording signal band for each magnetic head is reduced. In this figure, the reference numeral 55 shows an input terminal to which is applied an information signal to be recorded as shown in FIG. 13(*a*). This information signal is converted into a digital signal or a parallel code consisting of a plurality of bits as shown in FIG. 13(*c*) through the encoder 57 by means of the clock pulse (*b*) from the clock pulse generator 56. This signal (*c*) is applied to both the registers 58 and 59, which are energized respectively by the odd-numbered clock pulse (*b*)′ and even-numbered clock pulse (*b*)″, thereby dividing the signal (c) into two channels of alternate clock pulses. These clock pulses (*b*)′ and (*b*)″ are obtained by switch 60 through the clock pulse (*b*) from the clock pulse generator 56. As a result, the registers 58 and 59 produce the signals (*d*) and (*e*) of FIG. 13, respectively. The bits of the parallel digital pulses of the channels (*d*) and (*e*) are applied to the fixed heads (A) and (B) respectively arranged in the transverse direction on the tape (FIG. 14), so that each bit is recorded as one channel. At the time of reproduction, bit signals reproduced by the fixed heads (A) and (B) are combined into a signal shown in (C) after their passage through the registers 62 and 63. This signal is demodulated into signal (*a*) by the demodulator 64.

As can be seen from the above description, according to the present invention, a signal to be recorded is converted into digital pulses of $n$ bits, which are subsequently divided into those bits representing, say, the $i$-th sampled values and those bits indicating the $(i+1)$th sampled values. Bit signals from the respective bit groups are applied to the $2n$ magnetic heads arranged in parallel on the tape in the transverse direction thereof thereby to record the signals on the tape into $2n$ channels, thus making possible the reduction of the recording frequency band.

Although in the preceding embodiment the sampled values are divided into two channels, the present invention is easily applied to the division of signals into three or more channels. Also, the system according to the present invention finds use not only with the ΔPCM code but all types of digital code for a reduced recording frequency band for each head. This results in the possibility of an improved effect of the modulating means by selecting such modulating means most suitable to the signal source. As a consequence, even a signal of a great bandwidth can be magnetically recorded in a digital mode.

The application of the present invention is not limited to the recording and reproduction of a video signal with which the preceding embodiment is concerned, but effectively covers the recording of various signals including an audio signal.

What we claim is:

1. A magnetic recording and reproducing system comprising means for converting a signal to be recorded into an ΔPCM code of binary code signals arranged in parallel in *n* bits, means for converting said binary code signals arranged in parallel in *n* bits into code signals corresponding to said respective bits in the form of an NRZ code, and means for recording and reproducing signals from the code signals in an NRZ code of *n* channels on a recording medium of at least n channels by magnetic heads corresponding to the respective channels.

2. A magnetic recording and reproducing system according to claim 1 further comprising means for leading the code signals in an NRZ code of *n* channels into m registers, respectively, means for successively driving said *m* registers by clock signals in the ΔPCM code to distribute each channel of said code signals in an NRZ code of n channels into *m* channels and means for recording said code signals of *n* channels as *m* channels.

3. A magnetic recording and reproducing system according to claim 1, which further comprises means for generating an encoded key signal having *n* bits, means for selectively switching to either said key signal or said signal recorded into ΔPCM code so as to lead them into said *n* magnetic heads, a gate means for sampling said key signals from the signal reproduced from the magnetic tape for comparing an output of the gate means with an output of said means for generating the key signal, and means for controlling the feed of the tape according to the difference therebetween.

* * * * *